US011337420B2

(12) United States Patent
Tokle et al.

(10) Patent No.: US 11,337,420 B2
(45) Date of Patent: May 24, 2022

(54) CRYOPRESERVATION OF JUVENILE STAGES OF BARNACLES

(71) Applicant: Planktonic AS, Trondheim (NO)

(72) Inventors: Nils Egil Tokle, Trondheim (NO); Håvard Johan Aakerøy, Trondheim (NO)

(73) Assignee: Planktonic AS, Trondheim (NO)

( * ) Notice: Subject to any disclaimer, the term of this patent is extended or adjusted under 35 U.S.C. 154(b) by 666 days.

(21) Appl. No.: 16/303,311

(22) PCT Filed: Apr. 18, 2017

(86) PCT No.: PCT/NO2017/050094
§ 371 (c)(1),
(2) Date: Nov. 20, 2018

(87) PCT Pub. No.: WO2017/183990
PCT Pub. Date: Oct. 26, 2017

(65) Prior Publication Data
US 2019/0208769 A1    Jul. 11, 2019

(30) Foreign Application Priority Data
Apr. 18, 2016    (NO) .................................... 20160643

(51) Int. Cl.
*A01N 1/02* (2006.01)
(52) U.S. Cl.
CPC ......... *A01N 1/0284* (2013.01); *A01N 1/0221* (2013.01)
(58) Field of Classification Search
None
See application file for complete search history.

(56) References Cited

U.S. PATENT DOCUMENTS

| 4,155,331 A | 5/1979 | Lawrence et al. |
| 2014/0142331 A1* | 5/2014 | Behrens ................... C11B 1/10 554/224 |

FOREIGN PATENT DOCUMENTS

| CN | 103098792 A | 5/2013 |
| WO | 2014073980 A1 | 5/2014 |

OTHER PUBLICATIONS

Mazur Science (1970) 168: 939-949 (Year: 1970).*
International Search Report and Written Opinion dated Jul. 3, 2017 (PCT/NO2017/050094).
International Preliminary Report on Patentability dated Jul. 18, 2018 (PCT/NO2017/050094).
Anil, A. C. et al., "Cryopreservation of Balanus amphitrite nauplii," Cryobiology 34, 131-140 (1997).
Gwo, Jin-Chywan et al., "Preliminary Experiments on the Cryopreservation of Penaeid Shrimp (*Penaeus japonicus*) Embryos, Nauplii and Zoea," Theriogenology 49, 1289-1299 (1998).
Khin-Maung-Oo et al., "Cryopreservation of Nauplius Larvae of the Barnacle, Balanus amphitrite Darwin," Fisheries Science 64(6), 857-860 (1998).
Odintsova, N.A. et al., "Cryopreservation of the Cells and Larvae of Marine Organisms," Russian Journal of Marine Biology, vol. 38, No. 2, 101-111 (2012).
Subramoniam, T., "Cryopreservation of Crustacean Gametes and Embryos," Proc. Indian natn. Sci. Acad., B60, No. 3, 229-236 (1994).
Gakhova, E. N. et al., "Freezing of Larvae of Balanus improvisus to -196° C.," translated from Biologiya Morya, No. 4, pp. 62-65, Jul.-Aug. 1990.
Turner, Jefferson T., "The Feeding Ecology of Some Zooplankters That Are Important Prey Items of Larval Fish," NOAA Technical Report NMFS, pp. 1-34, Jul. 1, 1984.

* cited by examiner

*Primary Examiner* — Susan M Hanley
(74) *Attorney, Agent, or Firm* — Alix, Yale & Ristas, LLP

(57) ABSTRACT

A method for the cryopreservation of eggs, nauplii and juvenile of barnacles. Cryopreserved feed and a use of the preserved organisms as live feed organism in marine aquaculture typically replacing rotifers and Artemia and other life feed organisms.

20 Claims, No Drawings

CRYOPRESERVATION OF JUVENILE STAGES OF BARNACLES

BACKGROUND

The disclosure relates to a method for large scale cryopreservation of eggs, nauplii and/or juveniles of barnacles and to a method for revitalization of the cryopreserved organisms, and more particularly relates to a cryopreserved product or feed and a use.

Marine fish larvae are precocious when they start to feed and largely depend on life feed organisms as their first diet. Artificial diets such as dry feed diets are found suboptimal and are frequently leading to high mortality rates and reduced growth when used in the initial stages as diet for marine fish larvae. There are several reasons for this failure of artificial diets in the start-feeding phase. Besides others, the main reasons for this failure are generally lower ingestion rates of non-living prey items and a reduced digestibility, but also a loss of the nutritional value of the feed items and a higher organic load in the water. Start-feeding of marine fish larvae is therefore largely dependent on the supply of living prey, which has to be caught in the wild or cultivated for the purpose. The most common organisms used in start-feeding of marine fish larvae are the brine shrimp *Artemia franciscana* and different strains of rotifers *Brachionus sp*. These organisms are typically cultivated at the aquaculture site and directly fed as living prey. Even though widely used for this purpose, the nutritional value of these organisms is suboptimal to support optimal growth, development, and survival of marine fish larvae. Although different enrichment techniques have been developed to improve their nutritional value, such as with marine oils having a high content of omega-3 fatty acids, their dietary value is still considered sub-optimal, typically resulting in higher mortality rates, reduced growth and in many cases mal-developments compared to diets based on wild caught prey. Furthermore, their cultivation and enrichment is laborious and cost-intensive.

The natural diet of cold water marine fish larvae is typically nauplii and early copepodites of copepods in different stages such as *Acartia, Calanus finnmarchicus* etc. Using copepods in start feeding results in comparable high growth rates and good survival. As copepods are considered as an optimal diet, efforts have been made to improve their availability. One of the challenges with the use of copepods for start-feeding purposes is that wild catches are only possible in certain limited periods of the year when there is a bloom of these organisms in the sea. Furthermore, they have to be used right away as it is difficult to store living prey. Recently, techniques have been developed to cultivate copepods, but preservation techniques, in particular for on-grown organisms, are still a challenge.

Thus, there is a large need for alternative live prey diets in start-feeding of marine fish larvae. In particular, there is a need for live feed diets which are not dependent on on-site cultivation of the prey organisms or seasonal dependent wild catches. Moreover, due to limited fish resources in the sea and a worldwide growing demand for high quality marine raw material, in particular for marine lipids, there is a general need to exploit other resources in the sea apart from fish, especially of those organisms being on a lower trophic level such as planktonic species and unexploited marine invertebrates. For an efficient exploitation of these resources new methods and techniques need to be developed.

Cryopreservation is the use of very low temperatures to preserve structurally intact living cells and tissues, but also organisms. It utilizes the beneficial effect of decreased temperatures to suppress molecular motion and arrest metabolic and biochemical reactions. Specific procedures are needed in order to take advantage of the protective effects of low temperature and successfully store cells, tissues or organisms for extended periods of time in a cryopreserved form.

Cryopreservation methods seek to reach low temperatures without causing damage caused by ice formation during freezing. One important issue is the effectiveness of a later revitalization of the preserved cells and organisms.

Most studies in this field pertain to cryopreservation of cells, tissues, gametes (spermatozoa) and embryos mostly of medical and agricultural importance including mammalian species but also from non-mammalian vertebrates and invertebrates.

Cryopreservation methods are generally based on two different techniques, being controlled slow freezing techniques and very rapid freezing techniques (vitrification techniques) such as in liquid nitrogen. The application of a cryoprotectant in the preservation process shall reduce the negative effects which can occur during cryoprotection such as solution effects, extracellular ice formation, dehydration and intracellular ice formation.

Cryoprotectants are usually divided into two classes depending on their application and role in the preservation process. Intracellular cryoprotectants have a low molecular weight and permeate cells. The intracellular cryoprotectants such as glycerol and dimethyl sulfoxide are typically used at concentrations from 0.5 to 3 molar, whereby they minimize cell damage in many biological systems when these are frozen slowly. The choice of the cryoprotectant and its concentration will depend on many factors such as the exposure time before and during freezing, their biological toxicity and the individual tolerance of the biological material to the chemical. Typically, the material to be cryopreserved by using penetrating cryoprotectants is incubated with the cryoprotectant for a period sufficiently long such that an osmotic equilibrium in concentration is reached between the cryoprotectant and the organism to be preserved.

The rapid freezing technique usually makes use of extracellular cryoprotectants with relatively high molecular weight which do not penetrate cells. Examples are polyvinyl pyrrolidone and hydroxyethyl starch. These are effective at protecting biological systems which are cooled at rapid rates such as in liquid nitrogen. Some of these extracellular non-penetrating cryoprotectants have direct protective effects on cells membranes, however their primary mechanisms of action are related to the introduction of vitrification which is the process of extracellular glass formation.

It is well known from many cryoprotection studies that different cells have different requirements for optimum preservation methods applied. Optimal conditions for a considerable number of interrelated variables have to be defined. Especially, the cryopreservation of complex multicellular tissues and organisms is often accompanied by intriguing and formidable problems e.g. by extracellular ice formation. Furthermore, the size of the organism to be preserved affects the cryopreservation process. Smaller organisms are in general easier to preserve by slow freezing techniques since equilibrium is easier to achieve compared to larger organisms.

One of the main challenges in cryopreservation is the lack of suitable methods to preserve larger batches as needed in industrial scale applications such as for feed. Typically, cryopreservation techniques are applied in microliter or milliliter scale for example in small vials or straws with a volume between 0.5 and 1.5 ml. The application of the known techniques is therefore in general limited to small quantities and not suitable for larger quantities.

Khin-Maung-Oo et al. 1998 (Khin-Maung-Oo et al. Cryopreservation of Nauplius Larvae of the barnacle, *Balanus amphitrite* Drawin, Fisheries Science, 64(6):857-860) discloses a method for cryoprotection of nauplius larvae of the species *Balanus amphitrite* in small scale in cryoprotective straws. A preferred method included to drain the nauplii stage II for water and equilibrate them for 20 min in 1.5 M dimethyl sulfoxide as cryoprotectant in 29‰ sea water. The nauplius were cooled from 20° C. to −12° C. with 5° C./min, held at −12° C. for 10 min and thereafter frozen down to −30° C. at a rate of 0.5° C./min, kept for 20 min at −30° C. and quickly frozen to −196° C.

Gakhova et al. 1990 (Gakhova E.N. Freezing of barnacle larvae *Balanus improvises* to minus 196° C. Biologiya Morya (Valdivstock) (4): 62-65) discloses another method for cryopreserving of nauplii II of *Balanus improvises* in a two-step freezing process. 200 µl of a nauplii/cryoprotectant suspension in plastic tubes were frozen at a rate of 6 to 6.7° C./min to a temperature between −38 and −42° C., kept for 10 min at this temperature, and thereafter transferred to liquid nitrogen.

Anil et al. 1997 (Anil A.C., Tulaskar, A.S., Khandeparkar D. C., and Wagh, A.B. Cryopreservation of *Balanus amphitrite* nauplii. Cryobiology 34, 131-140) discloses a method for the cryopreservation of nauplii of *Balanus amphitrite* using three different cryoprotectants (ethylene glycol, dimethyl sulfoxide, and glycerol), wherein the larvae showed an increasing susceptibility to the applied cryoprotectant concentration. A concentration of 3 to 4 M ethylene glycol did not cause damage after an equilibration time up to 2 h. Nauplii have been cryopreserved in small volumes (straws) in a two-step slow freezing process combined with initial seeding at −8° C. The freezing rate was 5° C./min from 20 to 0° C., 1° C./min from 0 to −8° C. After seeding the cooling rate was 0.3° C./min by slow freezing until reaching at least −20° C., where the temperature was held for 20 min. Thereafter the straws were transferred to liquid nitrogen. The samples were transferred to liquid nitrogen when reaching −40° C. after slightly more than 2 hours. Anil et al. reported 90% revitalization one hour after thawing. However, the revitalization was only 35% after 24 hours.

SUMMARY

The disclosed embodiments provide a method for preservation and reviving of barnacles, in particular with focus on the early life stages i.e. their eggs, embryonic, larval, and juvenile stages. More particular, provided herein is a cryopreservation protocol for efficient cryopreservation of these organisms typically inhabiting the marine littoral zone. Furthermore, the disclosed embodiments allow exploitation of new marine species which are suitable as diet for start feeding purposes, such as for start-feeding of marine fish larvae and to provide methods, which makes it possible to exploit them with focus on an industrial application. Also provided herein is a method for the long-term storage of live feed organisms that can be used to efficiently replace today's live feed regimes in marine aquaculture production. In particular, provided herein is a method for large scale (quantities) cryoprotection of organisms which can be used as live feed organisms in aquaculture production such as in start-feeding of precocious marine fish larvae.

Also provided is a cryopreservation method for barnacle whereby a high revitalization for longer periods after thawing is achieved. This is in particular important when used as a start feeding since the consumption of the revived organisms by e.g. marine fish larvae is typically not immediate and but takes time after their addition to the cultivation units for fish larvae. A long-term survival of the prey for several hours or days is therefore important.

Still further provided is an efficient method for cryopreservation of large volumes per unit suitable for barnacle species having large nauplii.

Also provided is a method for the production of particulated cryopreserved feed having a high revitalization rate.

The disclosed embodiments relate to cryopreservation protocols for preserving and reviving of various early life stages (eggs, nauplii, and juveniles) of species of barnacles. One main purpose of the invention relates to the production of a preserved, storable product comprising these live feed organisms that can replace or supplement today's live feed regimes in marine aquaculture production.

Thus, according to a first aspect, provided herein is a method for large scale cryopreservation of eggs, nauplii and/or juveniles of barnacles, the method comprising the steps performed in the following order:
  draining of water from the organisms,
  adding of a 5 to 10 M cryoprotectant solution comprising a cryoprotectant selected from the group consisting of ethylene glycol, propylene glycol, glycerol, and dimethyl sulfoxide or a mixture thereof,
  freezing the mixture in a container according to the following subsequent steps:
    (i) freezing at a first slow freezing rate of no more than −1° C. min$^{-1}$ until approaching the temperature where the organisms in the mixture start to crystallize;
    (ii) freezing at a second slow freezing rate of no more than −0.1° C. min$^{-1}$ until the organisms and the cryoprotectant in the mixture are entirely crystallized; and
    (iii) a first rapid freezing rate to a cryogenic storage temperature.

Preferably, the volume ratio between the cryoprotectant solution and the drained organisms is at least 1:4, preferably between 1:4 and 2:1, more preferably between 1:4 and 1:1. This means that at least about 20% of the volume should be cryoprotectant and 80% organisms in the mixture.

In a preferred method, the first slow freezing rate is −0.5° C. min$^{-1}$ or less, preferably −0.3° C. min$^{-1}$ or less, more preferably −0.1° C. min$^{-1}$ or less.

An equilibration step can optionally be performed before the first freezing step, preferably lasting 5 to 60 minutes, more preferably between 15 and 30 minutes, most preferred about 15 minutes. The advantage of this equilibrium step is that the first slow freezing rates can generally be higher than if this step is omitted, without affecting the final product. The equilibrium step can be combined with a first slow freezing rate of −0.5 to −1° C. Equilibrium periods over 60 minutes are less preferred and are typically resulting in a reduced viability after freezing.

The equilibrium period can be shortened to less than 15 minutes or even omitted totally in particular if the freezing rate is less than −0.5° C. min$^{-1}$. Even though it could be shown that barnacles have a high tolerance to cryoprotectants, the advantage of a shortened equilibrium period is a reduced exposure of the organisms and a more time-effective freezing procedure. It was shown that barnacle nauplii are not negatively affected by a shortened or omitted equilibrium period when using a slow first freezing rate according to the disclosure. Surprisingly, the organisms do not seem to be dependent on reaching equilibrium before the onset of freezing.

For example when using a freezing rate of less than $-0.5$ ° C. min$^{-1}$ it is sufficient with an equilibration during said slow freezing process before crystallization is obtained. The advantage without a equilibrium step is a simplified process comprising less individual steps to be carried out.

In a preferred embodiment, the second slow freezing rate is between $-0.015$ and $-0.1$ ° C. min$^{-1}$ and preferably between $-0.04$ and $-0.08$ ° C. min$^{-1}$. Particularly preferred is a second slow freezing rate of $-0.05$° C. min$^{-1}$ and most preferred of $-0.04$ ° C. min$^{-1}$. This has the advantage that the freezing is particular gentle and that a very homogenous temperature distribution is achieved, which is afforded for larger volumes or mass treated in the same unit.

The second slow freezing rate preferably lasts until approaching at least $-30$° C., preferably to at least $-35$° C., more preferably to at least $-36$ ° C., most preferably from $-38$ to $-46$ ° C.

Preferably, the drained organisms have a dry weight content of 6 to 14% after drainage, more preferred between 8 and 12% and most preferred of about 10%.

Preferably, the cryoprotectant solution comprises 2.0 to 4.5% NaCl, more preferably 3.0 to 3.8% NaCl, most preferably 3.2 to 3.8% NaCl.

It is further preferred that the concentration of the cryoprotectant to be added to the organisms is between 6 and 8 M, more preferred between 6.5 M and 7.5 M. Particularly preferred is that the concentration of the cryoprotectant is at least 6 M, more preferred at least 7 M, most preferred 7.2 M. Preferably, the cryoprotectant is a mixture of ethylene glycol and propylene glycol, preferably in a mixture of about 50% each, more preferably of about 75% ethylene glycol and 25% propylene glycol.

The optional equilibration step is preferably performed at a temperature between 0 to 10° C., more preferred between 3 and 8° C., most preferred at about 5° C. Lower temperatures than 5° C. can result in reduced viability.

The method disclosed herein is particularly developed and suitable for larger amounts and volumes of organisms. Preferably, the amount of material to be cryopreserved in one unit is at least 5 g to 10 g, preferably at least 10 to 50 g, more preferred at least 50 to 100 g, most preferred between 200 g and 2000 g.

The mixture of the cryoprotectant and organisms can be placed in a container suitable for cryopreservation before the equilibrium step or directly thereafter. Said mixture in the container can have a maximal thickness during the freezing process of no more than 100 mm, more preferably of no more than 50 mm and most preferably of 10 mm or less.

Preferably, the first slow freezing rate is finished when a homogenous temperature in the material of about $-10$ to $-13$° C. is approached, preferably of about $-12$ to $-13$° C.

Long freezing times and slow freezing rates are important for the quality of the final product when preserving according to the disclosed embodiments. This is particularly relevant when preserving large amounts or volumes. Preferably, the total freezing process lasts at least 5 hours, more preferably between 6 and 10 hours, even more preferably between 10 and 12 hours and most preferably more than 12 hours. Thereby, high viabilities are achieved.

In another preferred embodiment, the organisms are cryopreserved in volumes of 5 to 50 ml, preferably in 10 to 25 ml, in suitable sized moulds. Preferably said moulds are made of silicone. Larger plates or pouches with cryopreserved organisms can be crushed into smaller particles in liquid nitrogen, whereby the obtained particles are preferably stored without any packing in liquid nitrogen. The advantage of the production of smaller particle or pellets is e.g. in a later use as start feeding organisms. This will facilitate their revitalization and dosing during feeding as life feed.

A second aspect of the disclosure relates to a method for revitalization of the cryopreserved organisms according to any of the paragraphs above, applying any of the methods selected from thawing them in a bath of warm water at 30-40° C.;

crushing the frozen material and washing it in running cold sea water at 10 ° C. or less, and thereafter revitalize them at <5 ° C. for up to 36 hours; or crushing the frozen material and incubating it in sea water with aeration at 10 ° C. or less, and thereafter revitalize them at <5 ° C. for up to 36 hours. The thawed organisms can optionally be adapted after thawing to the water temperature in the fish culture to be fed to.

A third aspect of the disclosure relates to a cryopreserved product or feed characterized in that it is obtained by any of the methods disclosed in the previous paragraphs related to the cryopreservation method.

Yet another aspect of the present disclosure relates to a cryopreserved product or feed comprising early life stages of barnacles characterized in that the barnacles are cryopreserved using ethylene glycol or ethylene glycol admixed with propylene glycol or glycerol as cryoprotectant, preferably added to the organism in a concentration of 6 to 8 M.

Finally, the disclosure also relates to a use of cryopreserved and revived early life stages of barnacles as live feed for marine fish larvae and invertebrates.

It will be appreciated that features of the invention described in the foregoing can be combined in any combination without departing from the scope of the invention.

DETAILED DESCRIPTION OF THE PREFERRED EMBODIMENTS

The disclosed embodiments relate to cryoprotocols for preserving and reviving of various early life stages (eggs, nauplii, and juveniles) of species of barnacles. One aspect relates to the production of a preserved, storable product comprising these live feed organisms that can replace or supplement today's live feed regimes in marine aquaculture production.

The cryopreservation method disclosed herein includes cryopreserving by very slow freezing techniques with several steps using high concentrations of below identified cryoprotectants (cryopreservants). The method is applicable to large batches (typically suitable for several hundred grams per unit to be frozen in one unit), which was not possible to effectively cryopreserve before. A great advantage is that the method is suitable for a large scale/industrial scale cryopreservation of early life stages of barnacles and in particular for an automated large scale production to obtain a new barnacle product suitable as start feed. The method is also suitable to produce a particulated material or pellets suitable for e.g. start feeding of fish (as life feed organisms).

The freezing rates for each of the steps in the disclosed protocol can vary depending on the amount and/or dimensions of material (in particular their extension in width) in each unit to be frozen. However, certain condition should be fulfilled in order to obtain optimal results (i.e. viable, non-harmed organism after the later revitalization). Depending on the step, it was found that a substantially homogenous distribution of temperature in the whole material during the freezing process is critical in order to achieve good results. This is especially critical from about −10 to −13° C. onwards in the freezing process, where the organisms, when mixed with the cryoprotectant, typically start to crystallize and in in particular between −20 and −25 ° C. when the cryoprotectant, e.g. ethylene glycol surrounding the organisms, typically starts to crystallizes or crystallizes. The exact temperature range for crystallization temperature can divert from −20 to −25° C. depending on the choice of cryoprotectant(s) and the amount of salt in the solution. A particularly critical point identified for the success of the method is the avoidance or limitation of a temperature increase in the material due to the heat release within the temperature range where the organisms crystallize, i.e. around −10 to −15 ° C., in particular between −12 to −13° C. A preferred cryoprotocol comprises the following features and steps:

As a first step, the organisms to be preserved are drained from sea water. Draining can e.g. be achieved by using nets or filters with a suitable mesh or pore size to retain the animals. Typically, the dry matter content of barnacle such as *Semibalanus balanoides* or *Balanus crenatus,* is about 10% after drainage. Although this may vary depending on the organism and its characteristics to retain water. Thus, the dry weight content may vary from 6-14% without significantly affecting the quality of the final product.

The drained organisms are thereafter mixed with a stock solution of a cryoprotectant. Preferably, ethylene glycol (stock solution of 7.2 molar ethylene glycol in salt solution comprising between 3 and 4% NaCl, preferably about 3.5% (NaCl) is used as cryoprotectant, preferably in a volume ratio of 1:4 to 1:1 cryoprotectant to organisms. The salinity of the stock solution can vary. For practical reasons, usually sea water is used in the stock solution, whereto salt (NaCl) is added to obtain the increased salinity. It is important to use high concentrations of cryoprotectant to obtain optimal results in the cryopreservation. In general, the concentration of the added cryoprotectant should be within the range of 5 to 10 M cryoprotectant, preferably between 6 and 8 M. Thus, it is preferred that the concentration of the cryoprotectant is at least 6 M cryoprotectant, more preferred at least 7 M, and most preferred about 7.2 M.

The addition of salt in the cryoprotectant solution was shown to improve the revitalization of nauplii compared to no salt addition. Especially the swimming activity was improved. The final salt concentration of NaCl is thereby preferably between 2.0 to 4.5%, more preferably between 3.0 to 3.8%, most preferred between 3.2 and 3.8%.

In another preferred embodiment, ethylene glycol is replaced by a mixture of ethylene glycol and propylene glycol as cryoprotectant. Best results were achieved when using a mixture of 75% ethylene glycol and 25% propylene glycol. A replacement of 50% of ethylene glycol is possible, but less optimal in terms of survival after revitalization. A replacement of 75% of ethylene glycol still resulted in some survival. Also, replacing 25% of the ethylene glycol with glycerol gave fairly good survival, but not as good as when 25% propylene glycol with 75% ethylene glycol were used or solely ethylene glycol was used as a cryoprotectant. The advantage of replacing ethylene glycol by propylene glycol or glycerol is a generally acknowledged lower toxicity of propylene glycol and glycerol. This is beneficial if the cryopreserved organism shall be used as feed for marine fish larvae as these are known to be very sensitive to chemicals including ethylene glycol. In another embodiment, dimethyl sulfoxide (DMSO) is used as cryopreserving agent. DMSO is less preferred in case of a later application as live feed due to its generally recognized higher toxicity.

The mixture of cryoprotectant and organisms can either be obtained directly in suitable containers such as bags, packages and pouches or transferred to these after mixing. Different types of materials can be used for packing as long as these are suitable to sustain the freezing, storage and later thawing process. Typically, containers, bags, moulds, or pouches made of cold-resistant plastic can be applied. Another suitable material is silicon. An example for a pouch which is used for the purpose has the following dimensions: 500 mm×190 mm×10 mm. This pouch is suitable to contain about 600 g of the mixture. Depending on the chosen ratio between cryoprotectants and organisms, a pouch of this size can typically contain between 300 to 450 g of barnacles to be preserved. Quantities (organisms and cryoprotectant mixed) in each unit to be frozen are typically in the range of 50 g to 1000 g. In some applications, smaller amounts per unit to be preserved individually may be preferred such as 5, 10, 20 or 25 g. However, the skilled person would understand that the inventive scope disclosed herein is not limited to these particular amounts and dimensions. Other dimensions and amounts of material for the pouches are possible as long as a controlled freezing and sufficiently even temperature distribution can be achieved in each unit during the following freezing process. This is in particular dependent on the thickness of the package/bag, which should preferably not exceed 50 mm, more preferably 10 mm, and most preferably 5 mm.

Surprisingly, it was shown that an equilibrium period before the onset of the freezing process according to the disclosed protocol is not essential for the success of the process. Thus, it could be shown, that a defined equilibrium step can be omitted totally without affecting the revitalization rate of the organisms when cryopreserved according to the disclosed embodiments when the first freezing rate is slow before crystallization.

Preferably, the cryoprotectant should be added to the organism at a temperature from 5 to 10 ° C. Lower temperatures are less preferred. Temperatures around 0° C. result in a reduced viability.

Optionally, the cryopreservation method can be combined with an equilibrium period. If performed the equilibrium period can typically last from 15-60 min. Periods being longer than 60 minutes, e.g. 120 minutes, may negatively affect the viability. Preferably, the temperature during equilibrium is within the range of 5° C. to 10 ° C., and most preferred about 5° C. during this phase for an effective uptake of the cryoprotectant. A temperature below 20° C. and in particular of 5° C. is assumed to be beneficial in the process due to a generally lower metabolic activity of the organisms in this phase that can have a protective effect. In a preferred embodiment, an equilibrium time of 15-30 minutes at 5° C. is used. However, tests performed have shown that even an equilibrium period of 24 hours with 7.2 M (stock solution) ice cold ethylene glycol as cryopreservant does not considerably harm barnacle nauplii of *Semibalanus balanoides* in a toxicity test. This indicates a very high tolerance to cryoprotectants in high concentrations and over long periods. The embodiments take advantage of this surprisingly high tolerance to high concentrations of cryoprotectant even when exposed over very long periods as during the freezing procedure. During the very slow freezing process according to the disclosure the organisms are exposed to this high concentration of cryoprotectant for long periods when freezing said larger batches compared to the method previously known from the prior art using straws.

The disclosed freezing process according to the thereby lasts for several hours, preferably at least 12 hours, from the equilibrium temperature (e.g. 5° C.), respectively the temperature when the cryoprotectant is added, to the temperature when the mixture is transferred to liquid nitrogen (typically at about −39 to −43 ° C., optionally from −30° C. or −35° C). It is found to be optimal that the freezing process lasts at least 5 hours and more preferably at least 8 hours, most preferably 12 to 16 hours. The freezing process may even last 24 hours or more. These very long freezing times were recognized as being necessary to achieve a high revitalization rate of the organisms when frozen in such large batch units. Thus, the periods of exposure during the freezing process are much longer compared to commonly known techniques applied in small volumes such as straws or when using fast freezing techniques based on vitrification.

After the equilibrium step, respectively after the cryoprotectant has been added, the container containing the mixture is transferred to a freezer, typically a controlled rate freezer that allows controlling of the freezing rates. The container (e.g. bag, mould, or pouch) is provided with suitable means for temperature monitoring inside the material. These means for temperature control are well known to the skilled person in the field and are therefore not explained in more detail. The mixture is thereafter treated by two subsequent slow freezing processes. During the whole freezing process it is crucial that the freezing rate applied results in a homogenous temperature distribution within the material. Thereby, harming of the organism is prevented or reduced. The freezing rate should preferably not exceed −1° C. min$^{-1}$ during the first slow freezing rate. More preferably, the freezing rate should be −0.5° C. min$^{-1}$ or less.

As an example, for a flat pouch (thickness about 10 mm comprising about 600 g of the mixture and placed in a controlled rate freezer) typically a freezing rate in the material of −0.05 to −0.5 ° C. per minute is applied between about +5° C. and about −12° C.

Often, an undercooling of the mixture is observed under the freezing process, and when the temperature goes down to e.g. −15 ° C., it increases to about −13 ° C. were the organisms crystallize. The latent heat of fusion (release of energy) causes this raise in temperature. The undercooling is variable, and often only a temperature of 0.5 ° C. or no temperature increase is observed, whereas other samples can have up to 3 ° C. raise in temperature. A raise in temperature of e.g. about 3 ° C. due to the crystallization of the cryoprotectant does not seem to negatively affect the organisms comprised in the mixture.

If ethylene glycol is used as cryoprotectant (i.e. 7.2 molar in 3% NaCl before equilibrium) in the mixture, it will typically start to crystalize around −20 to −25 ° C. The exact crystallizing temperature of the organisms and the cryoprotectant will also depend on the remained sea water content in the drained material prior to equilibrium as well as the salt content in the cryoprotectant solution. For example, a lower water content thereby results in a higher crystallization temperature of the organisms in the cryoprotectant mixture e.g. at about −16 ° C. with 12% dry weight of the drained material and at about −12° C. with 9% dry weight of the material. Depending on the freezing technique used, a higher freezing rate may be applied in this phase such as when using a freezer with circulating gas or a liquid freezer which allows a more efficient temperature transfer and distribution than a freezer filled with air and the like.

However, it is very important that a homogenous temperature distribution throughout the whole material is achieved when reaching from −12 ° C. to about −25 ° C.

It is very important that the decrease in temperature is very low in the second slow freezing step from −20 ° C. to about −40 to −42 ° C., when the mixture is transferred to liquid nitrogen. This is important to obtain an optimal revitalization efficiency of the organism frozen when preserved in said large quantities. In particular, a potential temperature increase caused by the crystallization of the cryoprotectant/organism mixture must be avoided or limited as it was found that this may critically affect the later revitalization efficiency. The freezing rate should there be at maximum −0.3° C. min$^{-1}$, preferably no more than −0.1 C min$^{-1}$ and more preferably no more than −0.05 ° C. min$^{-1}$. Particular good results (viability) were achieved by a second slow freezing rate of −0.04° C.

Alternatively to this very low freezing rate in the second freezing step, the temperature can be kept constant around ca. −12- to −13 ° C. and −22 to −23° C. for a longer period, typically for 0.5 to 3 hours depending on the thickness of the packed product, until a homogenous temperature distribution is achieved before the onset of the crystallization. After a holding period of 0.5-3 hours at −22 to −23 ° C., the freezing rate should not exceed −0.15 C. min$^{-1}$, and preferably no more than −0.08 C. min$^{-1}$. By using holding times, the in particular the second slow freezing rates can be chosen somewhat between higher than when no holdings times are applied.

It is important that the produced heat during the crystallization step is released before the temperature is reduced more. In particular, when using an air-based freezer, it is important that the temperature, i.e. of the surrounding air in the freezer, is kept as constant and stable as possible during the mentioned temperature release (in particular between −10 to −13 ° C. and −20 to −25 ° C.) thereby efficiently avoiding or minimizing a temperature increase in the product. Otherwise, harmful ice crystallization may occur with can negatively affect the revitalization rate of the animals.

When reaching about −39 to −43 ° C., the frozen material, typically in form of plates, is transferred to liquid nitrogen for further freezing (first rapid freezing step) and storage at a cryogenic temperature. Storage of the plates can be done in different ways such as in liquid nitrogen or a suitable freezer for cryogenic storage.

The plates can even be crushed to particles without any outer packaging before being added to the storage container.

The time to be used in the freezing procedure for larger quantities is typically at least between 5 and 10 hours, more preferably between 10 and 12 hours, most preferably more than 12 hours depending on the container (e.g. thickness of pouches) and freezer used.

To achieve good results, the whole cryopreservation process (starting from equilibrium of 30 min) for these mentioned larger amounts should not be performed faster than within 6 to 8 hours. A freezing time below 5 hours results in some viability, but was not found optimal for larger batches, where longer freezing times in general resulted in better survival than shorter times. Typically, the process takes between 12 to 24 hours depending on the volumes used in the freezing process. Instead of using a freezer wherein the air is cooled inside the freezer, a liquid freezer may be used. In the later case freezing times may be reduced due to a more efficient control of the freezing process and heat release.

By the disclosed method, eggs, nauplii, and cyprids of barnacles can be cryopreserved in large scale, e.g. in entities of about 5 g to more than one kg. The normal procedure in the field of cryopreservation is to cryopreserve organisms in milliliter or microliter scale, as in vials and straws (typically 0.5-1.5 ml). To achieve said large scale cryopreservation, cryoprotective agents (cryoprotectants) are used in higher concentration than anticipated to be tolerated for such target organisms over longer periods such as in the initial very slow 2-step freezing process applied according to the disclosed embodiments. Typically, with the procedure of slow freezing over such long times, a higher final concentration of cryoprotectant higher than about 3.2 molar is expected to result in a toxic effect during a long term exposure resulting in massive mortality of the organism to be cryopreserved.

Thus, a main advantage of this method is the possibility to cryopreserve large volumes in the same unit. Previously known techniques do not work as they are not suitable for these larger volumes resulting in low or no revitalization efficiencies. Successful revitalization is achieved if the organisms show normal swimming movements when revitalized.

The cryopreservation according to the disclosure is developed and approved for early live stages of barnacles inhabiting the littoral zone. Typically, these organisms have developed endogenous protective anti-freeze proteins to sustain a cold environment.

When larger quantities (number of animals) are preserved in the same batch to be cryopreserved together, it could be shown that a very slow freezing process is of high importance in order to achieve a homogenous temperature distribution throughout the whole material. By the cryopreservation protocol according to the disclosure which is based on a very slow freezing, long freezing times, in combination with a high cryoprotectant concentration such as of ethylene glycol as well as a defined salinity concentration, it was possible to achieve a high and reproducible viability of the preserved organisms even when preserved in these large freezing quantities.

By using the protocol disclosed herein, eggs larvae and juveniles of barnacles species can be cryopreserved. Examples for these are the species *Semibalanus balanoides* and *Balanus crenatus*. The nauplii of the former species are larger than the cryopreserved Barnacle nauplii known from prior art such as *Balanus amphithrite* and *Balananus* improvises. Larger organisms are generally more difficult to preserve by cryopreservation methods, in particular in methods where an osmotic equilibrium has to be achieved. *Balanus crenatus* (240 µm length, 100 µm width) has substantially smaller nauplius compared to *Semibalanus balanoides* (320 µm length, 150 µm width).

Most commonly cryoprotectants, in particular those penetrating cells, are used in very high volumes. Typically, the volume ratio of cryoprotectant to biological material should be 1:1. It was found that a much lower volume of cryoprotectant can be used without affecting the revitalization efficiency. Thus, it is possible to use a volume of 20-25% cryoprotectant to 70-75% Barnacle material when using the disclosed method. This is clearly an advantage as the use of these chemicals, often being rather toxic, is reduced and the total volume to be handled and stored is reduced. Furthermore, it reduces the amount of chemical waste when revitalizing the barnacles.

Another new aspect is that the time usually afforded to obtain an osmotic equilibrium with the added cryoprotectant before the freezing in order to avoid intracellular crystallization seems to be of minor importance for barnacles than for other organisms.

Apart from ethylene glycol other known cryoprotectants may be used with the method such as DMSO, as well as mixtures of ethylene glycol and propylene glycol or glycerol.

In the context of the disclosed embodiments early life stages of barnacles are meant to include eggs, larvae (e.g. nauplii stages), and, juveniles of these organisms. In particular, including the planktonic free-living stages of marine these organisms such as meroplanktonic stages.

Homogenous distribution of the temperature is to be understood that the temperature does not vary or only varies to a very low degree within the mixture (product).

Approaching a temperature is to be understood such that a further defined homogenous temperature ±2° C. is obtained within in the material during cryopreservation.

The crystallization temperature of the organisms in the mixture can be determined by measuring the temperature increase (energy release) in the mixture which occurs during their crystallization. This increase often occurs at a lower temperature, i.e. later in the freezing process, than the release due to the crystallization of the cryoprotectant. For the organisms in the mixture it is typically around −13 ° C., whereas the cryoprotectant e.g. ethylene glycol crystallizes at around −20 to −22 ° C.

Large scale preservation is to be understood that the method is suitable for cryopreservation of quantities in the same unit or batch, which are significantly higher than the quantities typically cryopreserved in known techniques such as in small straws and microliter or milliliter scale. These are typically amounts of 5 gram or higher (several hundred grams or even more than 1 kg), which are preserved simultaneously at the same time and in the same unit (container). However, this does not exclude that the method can be used for smaller volumes or amounts if desired. Thus, the skilled person will understand that the method is not restricted to a sole use in large scale cryopreservation, but may also be used with smaller amounts and volumes.

Reviving of Cryopreserved Organisms

Efficient revitalization of the cryopreserved organisms can be achieved using different methods. The pouches comprising the frozen organisms can be thawed in a water bath at 30 to 40° C., whereby it is important that the pouches are kneaded more or less continuously to achieve a homogenous temperature distribution inside the pouches. After thawing the organisms are poured on a 100 µm filter mesh and washed with seawater (preferably at less than 10 ° C.) to remove the cryoprotectant. After washing, the nauplii are revitalized in aerated seawater (at less than 5 ° C., preferably 0 to 3 ° C.) for more than 3 hours to achieve good swimming activity. Even better swimming activities are achieved in the time window 10 to 36 hours. The temperature of the thawed nauplii can slowly be adapted to the fish tank temperature in the course of the revitalization phase.

More preferred since resulting in an even higher swimming activity of the organism (e.g. barnacle nauplii) after thawing, is to crush the frozen content of the pouches on a sieve or filter which is continuously washed with sea water preferably colder than 10 ° C. After washing, the nauplii are revitalized in aerated seawater (less than 5 ° C., preferably 0 to 3 ° C.) for more than 3 hours to achieve good swimming activity. Even better swimming activities are achieved in the time window 6 to 36 hours. The temperature of the thawed nauplii can slowly be adapted to the fish tank temperature in the course of the revitalization phase.

Alternatively, and resulting in an even higher vitality of the thawed organisms is a method where the crushed content of the pouches is incubated in a tank with sea water and aeration. The disadvantage of this method is a potentially higher remaining concentration of the cryoprotectant in the organisms/water which may be toxic in a later application such as in start feeding of fish larvae. When using ethylene glycol as cryoprotectant the final concentration should not exceed 100 ppm per liter in start feeding.

Even more preferred is a method wherein the content of the pouches is crushed in a small volume of aerated sea water having a temperature below 5 ° C. and incubated until thawed (depending on the volume typically after 15 to 30 minutes). The water comprising the cryoprotectant is thereafter removed by use of filter with a mesh size being less than 120 µm. Thereafter, the animals are transferred to a tank filled with sea water for revitalization and temperature adaptation. For this purpose, they are typically kept there for several hours. The temperature in this tank should be less than 5° C. at the start. During the incubation, the temperature can be raised carefully to the temperature in the target fish culture to be used.

Even more preferred is a method wherein the content of the pouches is crushed (or pellets or pre-crushed directly from liquid nitrogen storage container) in a volume of aerated sea water having a temperature below 5 ° C., and where the sea water is continuously washed out (dilution rate of >5-10 litre per hour) for >4 hours, and revitalized for 8 hours or more. The temperature can be acclimatized to requested temperature before feeding the organisms to marine larvae.

Optionally activators such as sucrose may be applied during thawing and revitalization.

Embodiments of the invention are in the following also described, by the way of working examples. The described examples, corresponding to preferred embodiments, include the following steps:

1. Harvesting or cultivating of eggs and/or nauplius/larvae/early life stage from selected barnacle from the tidal zone e.g. of *Semibalanus balanoides* or below the intertidal zone, *Balanus crenatus*.
2. Optional transfer of the organisms to holding tanks with water and aeration for interim storage
3. Filtering of organisms in suitable quantities on a filter to drain water
4. Adding of a 7.2 molar solution of ethylene glycol (kept on ice) to the filtered drained material at a ratio of 1:4 to 1:1 (by volume). In theory, this results in a final concentration of 3.6 molar ethylene glycol in the mixture if fully equilibrated with the organisms. However as explained above and shown in the experiments below, the assimilation of the cryoprotectant by the organisms is far lower. There are indications that the equilibration is not 100%, but rather <15% with these organisms. The cryoprotectant contains 40% ethylene glycol and 60% seawater volume:volume (30 PSU; PSU=Practical salinity unit=g/kg) in volume (corresponding to a 7.2 molar solution). The seawater is further salinized to a final concentration of 50-70 PSU before mixed with ethylene glycol.
4. Typically about 600 g of the mixed organisms and cryoprotectant are transferred to a plastic pouch (e.g. 500 mm×190 mm×10 mm; made for resisting very low temperatures) and incubated for 30 min at 5° C. (equilibrium) or other suitable containers.
5. Pouches/containers with the organisms to be cryopreserved and the cryoprotectant, are transferred to a programmable freezer or to a normal ultra-freezer to be frozen.
6. The mixture is frozen to a temperature of about −12 to −13 ° C. A freezing rate of −0.05 to −0.5 ° C. per minute is applied between +5° C. and −12° C. for said pouches of about 600 g. Between ca. −13° C. and ca. −39° C. a freezing rate of −0.025 to −0.07° C. per minute is used such that the temperature is evenly distributed in the whole material. Higher freezing rates may be applied at this stage without harming the organisms as long as a homogenous temperature distribution in the material is achieved. This is particular the case if holding times are applied (see above).
7. The organisms in the mixture typically start to crystallize in the range of −12° C. to −16° C. In this range the temperature increase due to the heat release must be as low as possible. This is achieved by a preferred freezing rate between −0.02 to −0.1° C. per minute. Alternatively, the temperature can be kept constant around −12 to −15 ° C. for several hours such that a homogenous temperature distribution in the pouch is achieved before the onset of the crystallization.
8. The cryoprotectant crystallizes at a temperature of about −22 ° C. In this range the temperature increase due to the heat release must be as low as possible. This is achieved by a preferred freezing rate between −0.02 to −0.1° C. per minute, preferably −0.04° C. per minute. Alternatively, the temperature can be kept constant around −22 to −25 ° C. for several hours such that a homogenous temperature distribution in the pouch is achieved before the onset of the crystallization.
9. A slow freezing rate of typically −0.01 to −0.1 ° C. per minute, preferably −0.04° C. per minute, is applied within the temperature range of about −25 to about −38 to −43 ° C. The time to be used for this step should preferably be within 5 to 20 hours, preferably within 12 to 20 hours.
10. The frozen material is quickly removed from the freezer and transferred to liquid nitrogen and stored at a cryogenic temperature (e.g. −196° C.) until reviving.

Experimental Section

Experiment 1—Toxicity Test

Barnacle nauplii stage I and II of *Semibalanus balanoides* were exposed to a 7.2 molar solution of ethylene glycol (stock solution) and stored on ice. Samples were taken out after 0, 1, 2, 4, 8, 12, and 24 hours and the cryoprotectant was washed out to check viability of the nauplii. Levels of viability were identified as 0, 1, 2, 3, 4 and 5. "0" represents no activity (dead nauplii), 1-3 are twitching of appendages less than pre-cryopreserved nauplii, but 3 are close to natural swimming. 4 are swimming as pre-cryopreserved nauplii, and 5 are over-stimulated nauplii. Surprisingly, all nauplii recovered (level 2-3), and showed relatively good swimming behavior (80-90% of the individuals), even after 24 hour of exposure to the cryoprotectant.

The high vitality even after 24 hours indicates that barnacle nauplii stage I and II can tolerate surprisingly high concentrations of ethylene glycol for prolonged periods. This may indicate that ethylene glycol is only taken up to a limited degree by the animals, as this concentration is typically considered to be toxic during long term exposure. The hypothesis of a limited uptake of ethylene glycol during equilibration is supported by analysis of ethylene glycol in revived cryopreserved barnacle nauplii after thawing (see also below). Immediately after thawing, the nauplii was drained for water and frozen again. The nauplii were analyzed for their content of ethylene glycol. The results indicated that only 5% of the cryoprotectant was taken up by the organisms. Even though some of the ethylene glycol may already diffused out of the organisms in the thawing process before the analysis, the concentration of ethylene glycol in the organisms is probably far below a fully equilibrium with the cryoprotectant agent.

Experiment 2—Cryopreservation Using Different Cryoprotectants

The suitability of different cryoprotectants was tested in the tests described below by using the disclosed cryopreservation method. The details for the cryopreservation method and thawing procedure applied in these experiments are as follows:

Barnacle nauplii (*Semibalanus balanoides* or *Balanus crenatus*) were drained and concentrated (10% dry weight) and mixed 1:1 with a cryoprotectant (on ice). The mixture was filled, sealed and equilibrated in a pouch (600 gram consisting of 300 ml cryoprotectant and 300 ml barnacles) for 30 minutes at 5 ° C. before transferring to a controlled freezer. The pouch was put in an aluminum rack, and temperature loggers were put inside the pouch and in the freezer to measure air temperature. Alternatively smaller amount of about 60 g or vials were used in the tests.

After freezing from 5 to −42 ° C., with a duration of >12 hours using the disclosed method, the pouches were soaked in liquid nitrogen until −196 ° C. were homogenously achieved inside the pouches. The pouches were transferred to cryocontainers (with liquid nitrogen) of 175 liters, and stored for more than 48 hours. To check viability, the pouches were removed from the cryocontainer, crushed to get out the content and thawed in cold seawater (less than 5 ° C.). After 15 minutes, the thawed nauplii were washed on a 100 μm filter to remove the cryoprotectant. Revitalization was performed for >8 hours in an aerated tank with 30 PSU seawater (start temperature 2.5 ° C.).

A) Ethylene Glycol

Barnacle nauplii stage I and II from *Semibalanus balanoides* or *Balanus crenatus* were cryopreserved using a 7.2 molar solution of ethylene glycol as cryoprotectant after 1:1 mixing between cryoprotectant and organisms. High viabilities of were achieved after thawing, with >50% with natural swimming activity (level 4) and the remaining with swimming activity 1-3 (less than natural, but several close to natural swimming activity).

B) Dimethyl Sulfoxide

Barnacle nauplii stage I and II from *Semibalanus balanoides* were treated with a 6 molar solution of dimethyl sulfoxide (DMSO) as cryoprotectant and 1:1 mixing between cryoprotectant and organisms. Equilibrium was performed for 30 minutes at 3 to 5° C.

DMSO has a higher toxicity than ethylene glycol and is for that reason a less preferred alternative, although the viability after thawing was comparable to barnacle nauplii exposed to ethylene glycol.

C) Glucose or Propylene Glycol

Ethylene glycol was replaced by glucose or propylene glycol (40% glucose, methanol or propylene glycol by volume mixed with 60% by volume seawater; ethylene glycol 3.4 M, propylene glycol 5.4 M) and tested with nauplius stage I and II of *Semibalanus balanoides* (volume ratio 1:1) applying the disclosed cryopreservation method. Although some minor survival was found, the percentage of viable nauplii after thawing were minimal compared to ethylene glycol as cryoprotectant.

D) Ethylene Glycol and Propylene Glycol or Glycerol

The effect of different mixtures of the cryoprotectants ethylene glycol and propylene glycol or glycerol was tested on the viability of Barnacle nauplii stage I and II from *Semibalanus balanoides* after cryopreservation, in the manner disclosed. In this experiment 25, 50, or 75% of ethylene glycol were replaced by propylene glycol or glycerol (volume by volume). Exchanging 75% of the ethylene glycol with propylene glycol or glycerol resulted in a much lower viability than 7.2 M ethylene glycol solution (volume ratio 1:1 with organisms). Replacing 50% of ethylene glycol by propylene glycol or glycerol gave better results in terms of viability (although 50% propylene glycol gave far better results than 50% glycerol), while 25% propylene glycol resulted in a viability comparable or better than ethylene glycol when used as a cryoprotectant. 25% glycerol gave better results than 50% glycerol, but still far poorer results than 25% propylene glycol.

Since propylene glycol is less toxic than ethylene glycol, the mixture of 25% propylene glycol and 75% ethylene glycol represents a preferred cryoprotectant for the cryopreservation. In particular, when used as a marine life feed replacement diet.

Experiment 3—Cryopreservation Using Different Volume Ratios of Cryoprotectants

The effect of different volume ratios of cryoprotectants in relation to the volume of organisms to be preserved was tested. Intracellular penetrating cryoprotectants are generally added in a volume ratio of 50% cryoprotectant to 50% volume of organisms to be preserved.

The effect of different volume ratios of the cryoprotectant ethylene glycol was tested on the viability of Barnacle nauplii stage I and II from *Semibalanus balanoides*. Samples of these organisms were cryopreserved in a volume ratio of A) 30% cryoprotectant to 70% organisms (volume/volume) and B) 40% cryoprotectant to 60% organisms (volume/volume). The control was C) 50% cryoprotectant to 50% organisms (volume/volume). All tests were carried out in triplicate.

The organisms were cryopreserved according to the method of the disclosed embodiments and thereafter revived. There were no significant between the treatments in terms of viability.

The results support that very little amount of the cryoprotectants seems to be actually taken up into the barnacles and are necessary for the intracellular protection during the cryopreservation process. This is in contrast to other organisms, where it is known to be crucial for the revival that the cryoprotectant is taken up intracellularly and that the concentration must be very high to reach an equilibrium before freezing. Surprisingly, this does not seem to be valid for barnacle nauplii. Barnacle nauplii do not seem to depend on the establishment of equilibrium with the cryoprotectant before the freezing step in the cryopreservation is carried when following the method as disclosed herein. This is further supported by observations made in the context of the disclosure, that the organisms can be cryopreserved before an equilibrium is reached (see also experiment 4).

Experiment 4—Effect of Equilibrium Period on Viability

The effect of shortened incubation times before reaching an equilibrium with the cryoprotectant were tested with samples of nauplii I and II of *Semibalanus balanoides*.

The organisms were incubated for 0, 15, 30, 60 and 90 minutes in 7.2 M ethylene glycol at 5 °C. (1:1 volume ratio with organisms). Thereafter the organisms were cryopreserved by the disclosed method, stored in liquid nitrogen for 48 hours, thawed and revitalized. The barnacle nauplii were analyzed for their vitality using a binocular microscope. No significant differences in vitality were observed between the treatments, except for the sample stored for 90 minutes, which displayed less vital organisms than the other treatments.

Experiment 5—Intracellular Uptake of Cryoprotectant in Barnacles

Barnacle nauplii of *Semibalanus balanoides* were cryopreserved in 600 g packs as described herein using 7.2 M ethylene glycol with a volume ratio 1:1 to the organisms. After thawing, the nauplii were analyzed for ethylene glycol immediately after and draining of water. A small piece of frozen material was taken on a filter, and rinsed until it was thawed, and thereafter frozen and analyzed. This was the time zero sample, which resulted in between 7400-11000 ppm ethylene glycol. This indicates that about 5% ethylene glycol is taken up by the organisms. Probably more, as an efflux of ethylene glycol might have taken place, but it is hard to imagine that >10% ethylene glycol could be found inside the organisms. It is expected that a fully equilibrium would result in 3.6 M ethylene glycol inside the organisms. The stock solution of 7.2 M ethylene glycol has a concentration of 400 000 ppm. 600 gram sample were then transferred to 15 liter seawater, and analyzed after 15 minutes (drained and frozen), which displayed from 6100 to 7000 ppm ethylene glycol, which is <2% of the added ethylene glycol or about 0.1 M ethylene glycol. As a second step (to mimic the washing of the product at the fish farms), draining of water, and adding of 15 liter of seawater for washing the barnacle nauplii, the concentration inside the organisms was <300 ppm. When revitalized, the barnacle nauplii were drained again for seawater, and added 30 liters of seawater. After one hour, the content of ethylene glycol in drained barnacle nauplii was <25 ppm. After two hours, the content in drained barnacle nauplii was below detection level of 10 ppm. The tolerance level of aquatic animals for ethylene glycol is highly variable, but a level of 100 ppm or less is regarded as non-toxic for aquatic organisms in general.

The results indicate that roughly 5% of the cryoprotectant was actually taken up by the organisms. This is in contrast to reported uptake of this type of cryoprotectant in other organisms during cryopreservation by intracellular acting cryoprotectants. Barnacles do not seem to take up cryoprotectants at high rates. Without being bound to theory, this can be a result of endogenous anti-freeze agents already present in these organisms living in the littoral zone, where an exposure to low temperatures is not uncommon.

Experiment 6—Pelleted Cryopreserved Barnacles for Use as Feed

Also disclosed are methods for the production of cryopreserved feed particles or pellets. Tests have been carried out to effectively produce pelleted feed particles in smaller units for later use as start feed for marine aquaculture purposes.

In accordance with the disclosure, it was found that cryopreserved pelleted feed particles having a high revitalization rate can be produced by two different methods:

A) Large batches of material which were previously cryopreserved according to the method as disclosed herein as e.g. pouches/ plates comprising several hundred grams of material and stored in liquid nitrogen can be mechanically broken down into smaller particles/pellets in liquid nitrogen. Test were carried out in 600 g packs as described herein using 7.2 M ethylene glycol in a volume ratio of 1:1 with organisms. The obtained particles can be stored directly in liquid nitrogen without being packed or sealed in any way. The crushing did not affect the later revitalization rate even when stored for more than 7 months in liquid nitrogen after the crushing.

B) Pellets can be produced in a controlled cryopreservation freezer by freezing organisms in smaller volumes of typically 5 to 50 ml using the disclosed protocol. The pellets were produced by using suitable sized and shaped silicone moulds in the cryopreservation process using 7.2 M ethylene glycol at a volume ratio of 1:1 with organisms. Thereby standardized particle/pellet shapes and sizes can be achieved. The freezing in these moulds did not affect the later revitalization rate even when stored for more than 7 months in liquid nitrogen.

The invention claimed is:

1. A method for cryopreservation of eggs, nauplii and/or juveniles of barnacles, the method comprising the following chronological steps:
   (a) providing a source of organisms with water,
   (b) draining water from the organisms to provide drained organisms,
   (c) adding a cryoprotectant solution to the drained organisms to form a mixture, the cryoprotectant solution comprising a cryoprotectant selected from the group consisting of ethylene glycol, propylene glycol, glycerol, and dimethyl sulfoxide or a mixture thereof with a concentration within the range of between 5 M and 8 M,
   (d) freezing the mixture in a container using the following procedure:
      (i) freezing at a first slow freezing rate being not faster than $-1°$ C. $\min^{-1}$ until a temperature wherein the organisms in the mixture begin to crystallize;
      (ii) freezing at a second slow freezing rate being not faster than $-0.1°$ C. $\min^{-1}$ until the mixture of the organisms and the cryoprotectant are entirely crystallized; and
      (iii) freezing the entirely crystallized organisms and cryoprotectant until a cryogenic storage temperature is achieved.

2. The method according to claim 1, wherein the volume ratio between the cryoprotectant solution and the drained organisms in the mixture is at least 1:4.

3. The method according to claim 1, wherein the first slow freezing rate is $-0.5°$ C. $\min^{-1}$ or less.

4. The method according to claim 1, comprising an equilibration step lasting 5-60 minutes performed before the first freezing step.

5. The method according to claim 4, wherein the equilibrium step is combined with application of a first slow freezing rate of $-0.5$ to $-1°$ C. $\min^{-1}$.

6. The method according to claim 1, wherein the second slow freezing rate is between $-0.015$ and $-0.1°$ C. $\min^{-1}$.

7. The method according to claim 1, wherein the second slow freezing rate lasts until a temperature of −30° C. or lower.

8. The method according to claim 1, wherein the drained organisms have a dry weight content of 6 to 14% after drainage.

9. The method according to claim 1, wherein the cryoprotectant solution comprises 2.0-4.5% NaCl.

10. The method according to claim 1, wherein the concentration of the cryoprotectant added to the drained organisms is within the range of 6-8 M.

11. The method according to claim 1, wherein the concentration of the cryoprotectant added to the drained organisms is at least 7 M.

12. The method according to claim 1, wherein the cryoprotectant is ethylene glycol.

13. The method according to claim 4, wherein the equilibration step is performed at a temperature within the range of between 0° C. and 10° C.

14. The method according to claim 1, wherein the amount of material to be cryopreserved in one unit is at least within the range of 5 g-2000 g.

15. The method according to claim 1, comprising an equilibration step performed before the first freezing step, wherein the mixture of the cryoprotectant and organisms are placed in a container suitable for cryopreservation before the equilibrium step or directly thereafter, and wherein said mixture in the container has a maximal thickness during the freezing process of no more than 100 mm.

16. The method according to claim 1, wherein the first slow freezing rate is finished when the material has a homogenous temperature within the range of −10 to −13° C.

17. The method according claim 1, wherein step (d) of freezing lasts at least 5 hours.

18. The method according to claim 1, wherein the organisms are cryopreserved in individual volumes of 5-50 ml in molds.

19. A method for revitalization cryopreserved organisms that have been cryopreserved via the method of claim 1, comprising one or more from the group consisting of:
   thawing in a liquid bath having a temperature within the range of 30-40° C.;
   crushing the frozen material and washing the crushed frozen material in sea water having a temperature of preferably 10° C. or less to form washed crushed material, and lowering the temperature of the washed crushed material at temperature of less than 5° C. for up to 36 hours; and
   crushing the frozen material and incubating the crushed frozen material in sea water with aeration at a temperature of preferably 10° C. or less to form incubated crushed frozen material, and lowering the temperature of the incubated crushed frozen material to a temperature of less than 5° C. for up to 36 hours.

20. The method according to claim 19, wherein the thawed organisms are adapted after thawing to the water temperature in the fish culture to be fed to.

* * * * *